(12) United States Patent
Dou et al.

(10) Patent No.: US 10,357,913 B2
(45) Date of Patent: Jul. 23, 2019

(54) TRANSPARENT ORIENTED POLYPROPYLENE FILM WITH HIGH MOISTURE VAPOR AND OXYGEN BARRIER PROPERTIES

(71) Applicant: TORAY PLASTICS (AMERICA), INC., N. Kingstown, RI (US)

(72) Inventors: Shichen Dou, Warwick, RI (US); Tracy A. Paolilli, East Greenwich, RI (US); Keunsuk P. Chang, North Kingstown, RI (US)

(73) Assignee: TORAY PLASTICS (AMERICA), INC., North Kingstown, RI (US)

( * ) Notice: Subject to any disclaimer, the term of this patent is extended or adjusted under 35 U.S.C. 154(b) by 0 days.

(21) Appl. No.: 15/882,745

(22) Filed: Jan. 29, 2018

(65) Prior Publication Data

US 2018/0162035 A1    Jun. 14, 2018

Related U.S. Application Data

(62) Division of application No. 14/798,192, filed on Jul. 13, 2015, now abandoned.

(51) Int. Cl.

| | |
|---|---|
| *B29C 48/08* | (2019.01) |
| *B29C 48/91* | (2019.01) |
| *B32B 27/32* | (2006.01) |
| *B32B 27/08* | (2006.01) |
| *B29C 48/21* | (2019.01) |
| *B29C 48/22* | (2019.01) |
| *B32B 7/12* | (2006.01) |
| *B32B 27/28* | (2006.01) |
| *B29C 48/154* | (2019.01) |
| *B29L 7/00* | (2006.01) |
| *B29L 9/00* | (2006.01) |
| *B29K 23/00* | (2006.01) |

(52) U.S. Cl.
CPC .............. *B29C 48/91* (2019.02); *B29C 48/08* (2019.02); *B29C 48/154* (2019.02); *B29C 48/21* (2019.02); *B29C 48/22* (2019.02); *B32B 7/12* (2013.01); *B32B 27/08* (2013.01); *B32B 27/28* (2013.01); *B32B 27/32* (2013.01); *B32B 27/322* (2013.01); *B29K 2023/00* (2013.01); *B29K 2023/12* (2013.01); *B29K 2995/0026* (2013.01); *B29K 2995/0067* (2013.01); *B29L 2007/008* (2013.01); *B29L 2009/00* (2013.01); *B29L 2009/005* (2013.01); *B32B 2250/24* (2013.01); *B32B 2255/10* (2013.01); *B32B 2255/26* (2013.01); *B32B 2270/00* (2013.01); *B32B 2307/31* (2013.01); *B32B 2307/412* (2013.01); *B32B 2307/514* (2013.01); *B32B 2307/7242* (2013.01); *B32B 2307/7244* (2013.01); *B32B 2307/7246* (2013.01); *B32B 2307/7265* (2013.01); *B32B 2307/732* (2013.01); *B32B 2307/746* (2013.01); *B32B 2439/70* (2013.01); *B32B 2553/00* (2013.01)

(58) Field of Classification Search
CPC . B29C 47/0021; B29C 47/025; B29C 47/065; B29C 47/067; B29C 47/8805; B29K 2023/00; B29K 2023/12; B29K 2995/0026; B29K 2995/0067; B29L 2007/008; B29L 2009/00; B29L 2009/005; B32B 2250/24; B32B 2255/10; B32B 2255/26; B32B 2270/00; B32B 2307/31; B32B 2307/412; B32B 2307/514; B32B 2307/7242; B32B 2307/7244; B32B 2307/7246; B32B 2307/7265; B32B 2307/732; B32B 2307/746; B32B 2439/70; B32B 2553/00; B32B 27/08; B32B 27/28; B32B 27/32; B32B 27/322; B32B 7/12

See application file for complete search history.

(56) References Cited

U.S. PATENT DOCUMENTS

| | | |
|---|---|---|
| 5,139,878 A | 8/1992 | Kim et al. |
| 5,155,160 A | 10/1992 | Yeh et al. |
| 5,672,426 A | 9/1997 | Makhija et al. |
| 6,033,514 A | 3/2000 | Davis et al. |
| 6,033,771 A | 3/2000 | Heffelfinger |
| 6,632,383 B1 | 10/2003 | Peet |
| 6,788,379 B2 | 9/2004 | DaSilva Sobrinho |
| 2004/0166337 A1 | 8/2004 | Chang et al. |
| 2007/0004299 A1 | 1/2007 | Fitch et al. |
| 2008/0205800 A1 | 8/2008 | Su et al. |
| 2011/0076511 A1 | 3/2011 | Paolilli et al. |
| 2017/0015821 A1 | 1/2017 | Dou et al. |

OTHER PUBLICATIONS

Dou, Shichen et al., U.S. Office Action dated Jun. 2, 2017, directed to U.S. Appl. No. 14/798,192; 11 pages.
Dou, Shichen et al., U.S. Office Action dated Sep. 28, 2017, directed to U.S. Appl. No. 14/798,192; 14 pages.
Dou et al., U.S. Office Action dated Jul. 5, 2018, directed to U.S. Appl. No. 14/798,192; 12 pages.
http://plasticnotes.blogspot.com/2009/11 /polymer-polarity.html#!/ 2009/11 /polymer-polarity.html, Nov. 17, 2009; 2 pages.

*Primary Examiner* — Lawrence D Ferguson
(74) *Attorney, Agent, or Firm* — Morrison & Foerster LLP

(57) ABSTRACT

Described are transparent oriented polypropylene films with improved barrier properties and methods of making these films. The films and methods include a core layer comprising polypropylene, hydrocarbon resin, and polyethylene wax to improve moisture vapor barrier properties, an optional barrier layer comprising polar polymers to improve oxygen barrier properties, and optional skin layers to improve heat sealing, winding, printing, and/or adhesion.

11 Claims, No Drawings

TRANSPARENT ORIENTED POLYPROPYLENE FILM WITH HIGH MOISTURE VAPOR AND OXYGEN BARRIER PROPERTIES

CROSS-REFERENCE TO RELATED APPLICATION

This application is a divisional application of U.S. patent application Ser. No. 14/798,192, filed on Jul. 13, 2015, the entire contents of which is incorporated herein by reference.

FIELD OF THE INVENTION

This disclosure relates to an oriented polypropylene transparent film with improved barrier properties. More specifically, this disclosure relates to a multi-layer oriented transparent film that includes a core layer containing polypropylene, hydrocarbon resin, and polyethylene wax and at least one barrier layer containing polar polymers.

BACKGROUND OF THE INVENTION

In order to be used in packing applications, biaxially oriented polypropylene (BOPP) films should have excellent mechanical properties, excellent barrier properties (of moisture vapor and/or oxygen gas), and excellent heat sealability among other properties. In addition, BOPP films can include a promoting layer(s) suitable for various laminating, coating, and printing processes.

For some packaging applications, BOPP films should have both good moisture vapor and oxygen gas barrier properties as well as transparency. A high barrier to moisture vapor and oxygen gas can maintain product quality in an extended shelf life, whereas transparency provides consumers with visibility to the commodity product in packaging.

Metallization of BOPP films via vacuum deposition of aluminum is a well-known cost-effective method to significantly improve the moisture and oxygen barrier properties of BOPP films; however, the resultant films are opaque. Therefore, this technology is not suitable for packaging applications that require transparency.

U.S. Pat. No. 6,788,379 describes a plasma oxide coating process via enhanced chemical vapor deposition on different polymer sheets. The resultant oxide coated sheets demonstrated significantly reduced transmission rate for moisture vapor and oxygen gas. The process of aluminum oxide (AlOx) or silicon oxide (SiOx) coating of BOPP films via roll to roll web vacuum deposition provides a transparent thin coating layer of aluminum oxide or silicon oxide on the substrate that gives the packaging materials high moisture and oxygen gas barrier properties as well as transparency. However, AlOx or SiOx coating is extremely brittle and prone to cracking of the oxide coatings occurring in the downstream processes of converting and packaging applications, such that the high barrier properties of the packaging cannot be maintained due to said cracking. In addition, the cost of such oxide coating process is comparatively high and uncompetitive to most other high gas barrier OPP film technologies.

U.S. Pat. No. 5,672,426 describes a process of making a transparent liquid crystalline polymer (LCP) film via solvent casting. The LCP is dissolved in a solvent to an appropriate concentration and then cast into a film. Although cast LCP films have good transparency, excellent barrier properties for both moisture vapor and oxygen gas, and excellent mechanical properties, the solvent casting process is very costly and not environmentally friendly. Melt-extrudable LCPs have been known to present a processing difficulty in making LCP films. Limitations of LCP film extrusion include high temperature for processing, low melt viscosity, poor adhesion to substrates, broad variations in thickness, opaqueness to light, and uni-axial orientation due to the unique arrangements of LCP chains in the materials. Thus, the use of LCP packaging films is restricted to the applications of specialty packaging since both materials and processes are relatively expensive for general industrial packaging.

U.S. Pat. No. 5,139,878 describes a multilayer film structure comprising at least one fluoropolymer layer laminated to polyolefin or polyester layer via a tie layer or adhesive layer through a process of coextrusion or lamination. Such a resultant multilayer film exhibits high moisture vapor barrier and good transparency. However, the oxygen barrier of the resultant film is only slightly improved over the polyester film of similar thickness. Most fluoropolymers especially polychlorotrifluoroethylene (PCTFE) exhibit excellent moisture barrier properties (moisture transmission rates in the range of from 0.02 to 0.06 g/100 in$^2$/day) and transparency; however, the fluoropolymers usually do not provide significant oxygen gas barrier properties. Fluoropolymer films are restricted to use in specialty packaging since both fluoropolymers and equipment used for fluoropolymer film production are very expensive. In addition, fluoropolymer films during incineration generate hydrogen fluoride (HF) which is an environmentally hazardous byproduct.

BOPP films coated with polyvinylidene chloride (PVdC) exhibit both good moisture and oxygen barrier properties as well as good transparency as the PVdC coating reaches a thickness level required for the barrier properties. A few microns of PVdC coating on BOPP substrate is usually needed to achieve good moisture vapor and oxygen barrier properties. A costly offline coating process is needed to apply a thick PVdC coating on a BOPP substrate. Although PVdC coating is a good candidate for moisture vapor and oxygen gas, it also has well-known environmental issues. Coated BOPP films cannot be recycled into the reclaim streams of BOPP film production due to the intrinsic characteristics of PVdC materials. Furthermore, PVdC coating in packaging materials decomposes into hazardous substances (for instance hydrogen chloride, HCl) as PVdC coated films are burned by waste incinerators.

U.S. Pat. No. 5,155,160 describes a polyolefin film structure comprising a precisely loaded paraffin wax additive in the range of 3 to 10 wt % based on the weight of the polyolefin. The resultant film was claimed to have improved moisture vapor barrier. The film needed to be quenched immediately at a chill roll temperature of about 4° C. after it is extruded to avoid wax migration. Since the molecular weight of the paraffin waxes was in the low end range of 300 to 450 g/mole, while the loading in the film was at a high end range of 3 to 10 wt %. Inevitably, the paraffin waxes may migrate onto the surface of the resultant film in downstream processes such as orientation in machine and transverse direction, converting operations, and packaging applications, which may lead to wax plate-out problems and contamination of processing equipment. In addition, the resultant film showed very limited improvements in oxygen barrier.

U.S. Pat. No. 6,033,514 describes a biaxially oriented multilayered polypropylene film with improved moisture vapor transmission rates (MVTR) by incorporating a crystalline polyethylene wax additive into a core resin layer. The content of wax additive is in the range of 1.1 to 7.5 wt %.

A single core resin layer is extruded without outer layers, coated with two polyolefin cap layers after the orientation in machine direction, and oriented in the transverse direction. The barrier mechanism of the film is claimed to be that the wax additive in the core layer migrated throughout the polyolefin cap layers to form highly-crystalline continuous wax layers on the outer surfaces of the polyolefin cap layers. In the cases of coextruded outer layers or tie layers, all given examples showed no improvements in moisture vapor transmission rates. In a production line, it is not efficient to add two cap layers onto a single core layer at the stages in-between the two orientation steps. Although the outer polyolefin cap layers delayed the rate of wax migration, the wax additive in the core layer will continue to migrate through the polyolefin cap layers and form wax crystals on the surface, which may cause processing issues downstream such as wax plate-out or build-up. In addition, the resulting film showed very limited capability to improve oxygen gas barrier which is required for some food packaging applications.

U.S. Pat. No. 6,033,771 describes the use of waxes to improve moisture and oxygen barrier properties of multilayer BOPP films. In this patent, 4.5 wt % Fischer Tropsch wax is blended into a polypropylene core layer which is cavitated to form voids. The voids in the core layer are used to entrap the wax molecules to prevent them to migrate to the surface, thus avoiding plate-out problems. However, the cavitation of the intermediate layer renders the resulting film opaque and no longer transparent.

SUMMARY OF THE INVENTION

As pointed out in the Background section, there is a need for an economical method to improve barrier properties of transparent BOPP films. Applicants have discovered film formulations that result in optically clear films with both high moisture vapor and oxygen barrier properties by utilizing a combination of a polypropylene core layer comprising hydrocarbon resin and crystalline polyethylene wax, and polar polymeric barrier coatings. The resultant films can include a core layer for improving moisture vapor barrier properties, optional barrier layers for improving oxygen barrier properties, and optional skin layers (also referred to as outer layers unless coated with a barrier layer and then the barrier layer becomes the outer layer and the skin layer becomes a tie or adhesion layer (i.e., outer layers are exposed to air) for improving heat sealability, winding, printing, and/or adhesion.

Described are transparent oriented polypropylene films with improved barrier properties and methods of making these films. The films and methods include a core layer comprising polypropylene, hydrocarbon resin, and polyethylene wax to improve moisture vapor barrier properties, an optional barrier layer comprising polar polymers to improve oxygen barrier properties, and optional skin layers to improve heat sealing, winding, printing, and/or adhesion.

In some embodiments, the films disclosed herein comprise a core layer that can provide the desired mechanical properties and moisture vapor barrier properties; an optional skin layer which can be formulated to have properties of heat sealing, winding, adhesion, or printing; an optional barrier layer comprising polar polymers that can improve the oxygen barrier; and an optional tie layer (adhesion promoting layer) in between the core layer and the barrier layer that can bond a polar barrier layer to a nonpolar core layer. The core layer of the film can include high crystalline polypropylene, hydrocarbon resin, and polyethylene wax. Specifically, the core layer of the film can be a layer of highly isotactic crystalline polypropylene (HCPP) blended with hydrogenated hydrocarbon resins (HCR) and synthetic polyethylene waxes (PE wax). The highly isotactic crystalline polypropylene can have an isotactic index greater than 95%. The contents of HCR and PE wax in the core layer can be about 2.5 to 25 wt % and about 0.5 to 2.0 wt % of the core layer, respectively. In addition, the contents of the HCR and PE wax in the core layer can be 5 to 15 wt % and about 0.75 to 1.5 wt % of the core layer, respectively. The hydrocarbon resin can have a glass transition temperature (Tg) from 80 to 90° C. and can have a softening temperature from 135 to 145° C. In addition, the polyethylene wax can have a crystallization temperature (Tc) less than the Tg of the hydrocarbon resin of the core layer. The hydrocarbon resin can be a fully hydrogenated water-white hydrocarbon resin. Furthermore, the polyethylene wax can have a melting temperature from 65 to 92° C. In addition, the polyethylene wax can comprise synthetic crystalline polyethylene wax, paraffin wax, Fischer-Tropsch wax, or combinations thereof.

Without being bound by any theory, it is thought that the HCR additive with high Tg can entrap the PE wax molecules in the core layer. Optionally, a desirable amount of fluoropolymer additive in the range of about 100 to 1000 ppm can be added to the core layer to improve the distribution of PE wax additives and help further enhance the moisture barrier. Any tie layer(s) and skin layer(s) can be coextruded with the core layer while the barrier layer can be inline or offline applied to the outer surface of the tie layer. In addition, the barrier layers can also be coextruded with the core layer. Suitable polymers for the tie layers and outer layers can include polyolefins such as homopolymers, copolymers, or terpolymers of the monomers of ethylene, propylene, and butene, and maleic anhydride grafted or copolymerized polyolefins. The laminate films can be oriented either uniaxially or biaxially. The films can be oriented biaxially in both the machine and transverse directions. In addition, the barrier layer can be a cross-linked product of PVOH/polyvinyl amine, or PVOH or EVOH polar polymers, and/or blends thereof.

In some embodiments, the films disclosed herein could also be designed only for moisture barrier application if oxygen gas barrier is not required for a package. The laminate films could be a multilayered laminate film comprising a core layer as described above and two skin layers which could be formulated as layers for the purposes of heat sealing, winding, adhesion, or printing, respectively. In this case, the layer of polar polymers for oxygen barrier may not be included in the laminate film structure.

In some embodiments, the films disclosed herein can comprise a core layer comprising high crystalline polypropylene, hydrocarbon resin, and polyethylene wax; a skin layer on a surface of the core layer comprising polyolefin; and a barrier layer comprising polar polymers. The core layer can also comprise a fluoropolymer additive. In addition, the hydrocarbon resin can comprise 2.5-25 wt % of the core layer and the polyethylene wax can comprise 0.5-2.0 wt % of the core layer. The barrier layer can be on a surface of the core layer opposite the skin layer. The films can also include a tie layer on a surface of the core layer opposite the skin layer between the core layer and the barrier layer. The tie layer can comprise polyolefins including homopolymers, copolymers, maleic anhydride grafted or copolymerized polyolefins, or combinations thereof. The skin layer can also comprise the same or similar polyolefins as the tie layer. In addition, the skin layer can include antiblocking agents. The films can have a total thickness of about 10 to 60 μm or about 15 to 25 μm. In addition, the films can have a moisture vapor transmission rate less than 0.12 g/100 in$^2$/day and an oxygen gas transmission rate less than 1.5 cc/100 in$^2$/day. Furthermore, the films can have a haze less than or equal to 5%.

In some embodiments, the films disclosed herein can include a core layer comprising high crystalline polypropylene, hydrocarbon resin, and polyethylene wax; a first layer on a surface of the core layer comprising polar polymers; and a second layer on a surface of the core layer opposite the first layer comprising polar polymers. The core layer can also comprise a binding promoter comprising maleic anhydride grafted polypropylene. The films can also include a skin layer on one or both surfaces of the first and second layers opposite the core layer.

Some embodiments include methods of making the films disclosed herein, wherein the methods can include coextruding a core layer comprising high crystalline polypropylene, hydrocarbon resin, and polyethylene wax with a skin layer comprising polyolefin. The methods can also include coextruding a barrier layer comprising polar polymers on a surface of the core layer opposite the skin layer or inline or offline coating a barrier layer comprising polar polymers on a surface of the core layer opposite the skin layer. The films can be oriented in the machine direction prior to the coating of the barrier layer and can be oriented in the transverse direction after coating the films with the barrier layer. In addition, the methods can include coextruding a tie layer comprising polyolefin on a surface of the core layer opposite the skin layer and inline or offline coating a barrier layer comprising polar polymers on a surface of the tie layer opposite the core layer. In addition, the barrier layer can be coextruded on a surface of the tie layer opposite the core layer. The methods can further include heat aging the films. The aging temperature can be lower than a Tg of the hydrocarbon resin and a melting temperature of the polyethylene wax. In some embodiments, the aging temperature is 40-70° C. and the aging time is from 12 to 48 hours.

In some embodiments, the laminate films could be three-layer films comprising a barrier layer of polar polymers for oxygen gas barrier, a core layer for moisture vapor barrier, and an outer non-polar layer. The layer of polar polymers can be on a surface of the core layer. The core layer can be sandwiched between the polar polymer barrier layer and a non-polar layer through coextrusion. The films can be oriented uniaxially or biaxially. The layer of polar polymers can also be added to one surface of the core layer (in case of 2-layer coextruded laminate film) through a process of inline or offline coating. The non-polar outer skin layer can function as a heat sealable layer or a layer to be formulated for the purpose of winding, adhesion, or printing. A desirable amount of polar maleic anhydride grafted polyolefins can also be added into the core layer to achieve strong bond strength between the interface of the core layer and the barrier layer of polar polymers, as a discrete tie layer for promoting adhesion may not be included in this specific film structure. Suitable polar polymers can include maleic anhydride (MAH) grafted polypropylene.

In some embodiments, the coextruded oriented laminate film could be a two-layer film comprising a core layer described above and an outer skin layer. The outer skin layer could function as a heat sealable layer or a layer formulated for the purpose of winding, adhesion, or printing. The side of the core layer opposite the skin layer could be corona discharge-treated to allow for higher surface energy for the suitability to receive coatings, inks, or to laminate to another substrate with adhesives.

In some embodiments, the laminate film is a four-layered or five-layered oriented film. The polar polymers for oxygen barrier enhancement could be incorporated into the structure of a multilayered laminate film as one intermediate layer or tie layer, preferably two intermediate layers or tie layers, on at least one surface of the core layer. The intermediate layer(s) could be coextruded with the core layer and outer layers of the laminate film and then oriented. Suitable polar polymers can include extrudable EVOH or PVOH or blends thereof and/or other extrudable polar polymers with excellent oxygen barrier properties. Polar polymeric compatibilizers or tie-resins can be added into both the skin layers and the core layer to achieve strong bond strength between the interfaces of intermediate layers and other layers. Suitable polymeric compatibilizers can include maleic anhydride (MAH) grafted polyolefin homopolymers and copolymers, as well as maleic anhydride copolymerized copolymers or terpolymers, preferably with a MAH grafting rate of from 0.5 to 2.0 wt %. With two polar intermediate layers immediately next to the core layer, possible wax migration can be avoided or substantially minimized even if the wax content in the core layer is slightly higher, since the polar intermediate layers will repel the non-polar wax and keep it from migrating out of the core layer.

Various specific embodiments, examples, definitions and descriptions are adopted in the art for understanding the invention. The details in the art are only used to provide specific preferred embodiments and exemplary to those skilled in the art. The scope of the invention will refer to any one or more in the appended claims, but not necessarily all, of the invention defined by the claims.

It is understood that aspects and embodiments of the invention described herein include "consisting" and/or "consisting essentially of" aspects and embodiments. For all methods, systems, compositions, and films described herein, the methods, systems, compositions, and films can either comprise the listed components or steps, or can "consist of" or "consist essentially of" the listed components or steps. When a system, composition, or film is described as "consisting essentially of" the listed components, the system, composition, or film contains the components listed, and may contain other components which do not substantially affect the performance of the system, composition, or film, but either do not contain any other components which substantially affect the performance of the system, composition, or film other than those components expressly listed; or do not contain a sufficient concentration or amount of the extra components to substantially affect the performance of the system, composition, or film. When a method is described as "consisting essentially of" the listed steps, the method contains the steps listed, and may contain other steps that do not substantially affect the outcome of the method, but the method does not contain any other steps which substantially affect the outcome of the method other than those steps expressly listed.

DETAILED DESCRIPTION OF THE INVENTION

Described are films and methods of making and using transparent polypropylene films with improved moisture vapor and/or oxygen barrier properties. Efforts to enhance the moisture vapor barrier of transparent BOPP films in a cost-effective manner have often involved the methods of adding the additives of HCR or PE waxes into the core layer of the multi-layer BOPP film. Hydrogenated hydrocarbon resin (HCR) can be used in making BOPP films with improved moisture barrier properties. A typical BOPP film modified with hydrocarbon resin exhibits moisture transmission rates about 1.5 to 2 times better than the moisture barrier properties of a non-HCR-modified BOPP film. An HCR-modified BOPP film has better moisture barrier, and its transparency can be maintained at the same level as its unmodified counterpart. The oxygen gas transmission rate (O2TR) of the HCR-modified film can be reduced to about 50% of its original O2TR. Thus, hydrocarbon resins can improve the barrier properties of BOPP films; however, the improved barrier to both moisture vapor and oxygen gas is often not enough for demanding applications where the product shelf life needs to be significantly extended.

To improve the oxygen barrier properties of transparent BOPP films, polar polymers as coatings or coextruded layers are usually applied to a tie-layer bonded to a polypropylene substrate through an inline or offline process. However, the polar polymers such as polyethylene vinyl alcohol (EVOH), polyvinyl alcohol (PVOH), or polyhydroxyaminoether (PHAE) or other polar polymers with high oxygen barrier properties are often inadequate for moisture vapor barrier, since these polar polymers absorb moisture and allow polar water molecules to diffuse through them easily. Moreover, the process of moisture absorption due to strong polar molecular attractions (for instance, hydrogen bonding) swells the structure of relatively hydrophilic EVOH or PVOH in high humidity conditions and deteriorates gas and vapor barrier properties. Cross-linking of EVOH and PVOH or other polar polymers by crystallites or chemical reaction can lessen the swelling or plasticization of moisture/water to the film structure. In comparison, the aromatic structure of relatively hydrophobic PHAE resists water absorption and swelling. Therefore, the moisture vapor barrier of BOPP films cannot be achieved through the coatings of coextruded layers of polar polymers.

However, HCR and PE wax additives as moisture barrier promoters are often not combined together in a polypropylene core layer; instead, either a HCR resin or a PE wax resin is incorporated into the core layer to improve the moisture barrier of the film. As described in the art, the moisture vapor transmission rate of a HCR modified BOPP film is about 1.5-2 times lower than that of a non-HCR modified BOPP film. However, the improved moisture vapor barrier is not enough for severe packaging applications and the situation of long extended shelf-life properties. Where a PE wax additive was used, the moisture vapor transmission rate was reduced significantly to 0.10 g/100 in$^2$/day or less, which is lower than that which can be obtained from using HCR modification alone. However, the prior art either adds a significant amount of waxes in the range of 3 to 10 wt % in the core layer or adds a special capping process to both surfaces of the core layer between MDO and TDO to avoid undesirable wax migration to the surfaces of the film. In practice, these methods are extremely inefficient for a state-of-the-art BOPP line, and the wax migration to the surface of production equipment (plate-out) cannot be avoided.

Without being bound by any theory, the mechanism behind the films disclosed herein is as follows. The simplest way of understanding the diffusion of an individual penetrant is to look at its path through space or through a medium. It is believed that the transmission rate of moisture vapor in a polymer crystal (lamellar) is a few orders of magnitude lower than that in the amorphous phase of the polymer. The transmission rate of an individual penetrant in a polymer film is thus dominated by its transmission rate in the amorphous phase structure of the polymer film; the transmission rate of an individual penetrant through polymer crystals (lamellae) is usually ignored due to its low orders in magnitudes. Herein, an individual penetrant (water molecule) is considered to diffuse only in the amorphous phase through tortuous pathways. For a BOPP film to have high moisture barrier, the film needs to have two important factors: high crystallinity and low free volume in the amorphous phase. High moisture barrier of a BOPP film can be reached by a good balance of the two factors. In the films disclosed herein, hydrogenated hydrocarbon resins and synthetic polyethylene waxes can be added into the core layer of a BOPP film to reduce the free volume of PP chain segments in the amorphous phase. The content of PP crystals in the core layer of the films can decrease accordingly with increasing content of HCR and PE wax resins (since the volume of the HCR and wax displaces a corresponding volume of isotactic crystalline PP), while the content of the free volume of the amorphous region in the core layer can decrease with increasing entrapping effects of added HCR resin to PP chain segments in the amorphous phase. The crystallinity of the highly isotactic polypropylene can maintain its initial crystallinity prior to the addition of the two additives.

Crystallization of highly isotactic crystalline polypropylene resin in the core layer during cooling is a two-step process: 1) formation of nucleation centers (nuclei) and 2) formation of lamellae (crystal growth). One part of a polypropylene chain (crystallizable long molecule) stacks on the nuclei to form lamellae, another part of the polypropylene chain tends to transverse through multiple lamellae, forming interlamellar links, which are random coil structures or entangled amorphous chain segments. Molten HCR and PE waxes (non-crystallizable at the crystallization temperature of polypropylene) do not stack into compact lamellar phase. Instead, they can be phased into the amorphous phase of the core layer, which includes random coils and entanglements of polypropylene chain segments at the crystallization temperature of HCPP resin. PE waxes at low content are miscible in hydrocarbon resin at the extrusion temperature of the core layer or even a lower temperature, forming a homogeneous mixture with HCR and HCPP.

At stretching temperatures, block slippage can occur within HCPP lamellae, followed by a stress-induced fragmentation and recrystallization. The molten HCR and PE waxes can reduce the viscosity of the semi-molten blend and make the process of reorganizing polypropylene chains easier.

As the films are cooled from the Tc of HCPP to the Tg of HCR, secondary crystallization outside of the stacked lamellae can take place to form more perfect lamellae. The cohesion of molten HCR, PE waxes, and PP chain segments in the amorphous phase can reduce to some extent the formation of nanovoids (empty space), which could have been generated in a BOPP film without the addition of HCR. The miscibility of HCR, PE waxes, and PP chain segments in the amorphous phase can decrease with decreasing cooling temperature. As the temperatures reach the Tg of HCR, HCR can solidify to form partially connected HCR domains with entrapped PP chain segments and PE wax molecules, depending on the content of HCR in the core layer. Since solidified HCR resin makes PP chain segments and PE wax molecules entrapped in the amorphous phase due to initial cohesion and change in miscibility, some PP chain segments and PE wax molecules can become entrapped in the solidified HCR phase. These entrapped PE wax molecules can be released from the solidified HCR phase slowly at elevated aging/annealing temperatures. The released PE waxes could form small wax crystals in the nanovoids existing in the amorphous phase at the temperatures lower than the Tc of PE waxes.

Below the Tg of HCR and the Tc of PE waxes (which can be less than the Tg of HCR), some of the un-entrapped amorphous PP chain segments can be free to move locally to some extent within the constraints of the solidified HCR molecules. The un-entrapped mobile PE waxes can move slowly to occupy the nanovoids existing in the amorphous phase to form PE wax crystals. Therein, below the Tg of HCRs, there can exist connected or unconnected nanovoids newly formed in the amorphous phase due to the motion of amorphous PP chain segments, recrystallization, and shrinkage. Mobile PE wax molecules can move into these nanovoids and form small wax crystals. The PE wax crystals block the tortuous pathways of moisture vapor diffusion, therein the MVTR can be further reduced to a lower level in comparison with the MVTR of adding hydrocarbon resin alone. The small PE wax crystals can grow to large sizes at elevated temperatures (aging/annealing) due to secondary recrystallization. Aging or annealing the films at elevated temperatures can facilitate the release of trapped PE wax molecules and the crystallization and secondary recrystallization of PE wax crystals in the nanovoids.

Without the HCR in the core layer, PE waxes can be immiscible with HCPP resin, and the local motion of PP chain segments (it is believed that the Tg of PP resin is lower than 15° C.) in the amorphous phase can be constrained at ambient temperatures. The PE wax molecules in the core layer tend to migrate to the surface of the films at temperatures above the Tm of PE waxes or below the Tm of PE waxes for the uncrystallized PE waxes. Although low temperature quenching (at 4° C.) was applied to cool the surface of the cast film for the purpose of eliminating wax migration as described in the prior art (U.S. Pat. No. 5,155,160), molten PE waxes can easily migrate to the surface of the films during MDO and TDO. Even if some PE waxes stay in the amorphous phase, since there is no constraint to the local motion of the amorphous PP chain segment, PE waxes may have very limited contribution to the reduction of free volume in the amorphous phase. The PP chain segments in the amorphous phase can be movable locally (dynamically) at a scale much larger than with the constraints of added HCR. Added PE waxes may not reduce the effective free volume of the amorphous phase in the core layer. Relatively high free volume in the amorphous phase of the core layer can allow for moisture vapor to diffuse through a film at a higher transmission rate. Thus, the MVTR barrier improvements seen in the prior arts (U.S. Pat. Nos. 5,155,160 and 6,033,514) greatly rely on the wax migration to the surface of the films. Two comparative examples in the art, with 2.0% PE wax added in to the core layer but no HCR, showed a much higher moisture vapor transmission rate than that of the examples with both added HCR and PE waxes.

PE waxes at low contents can be miscible in hydrocarbon resins at the extrusion temperature of the core layer or even a lower temperature, forming a homogeneous mixture with HCR and HCPP. Polypropylene resins can solidify from molten state due to crystallization as temperature decreases. PE waxes and hydrocarbon resins can be phased into the amorphous phase of the core layer. The PE waxes in the amorphous phase can crystallize at temperatures much lower than that of polypropylene resins and thus can form small PE crystals in the unconnected or interconnected nanovoids, therein blocking the tortuous pathways for moisture vapor diffusion leading to a significant decrease in moisture vapor transmission rate.

The films disclosed herein can incorporate both HCR and PE waxes into the core layer of film to improve moisture vapor barrier. A desirable amount of high Tg HCR resin (Tg>70° C.) not only can constrain the mobility of the PE waxes and the mobility of the chain segments of PP in the amorphous phase of the core layer, but it also can occupy the nanovoids existing in the amorphous phase of the core layer, leading to a reduction in the free volume of the core layer. Although the mobility of non-crystallizable PE waxes and amorphous PP chain segments (Tg<15° C.) can be restricted to a low extent, they are still locally mobile. The mobile PE waxes can fill into the nanovoids existing in the amorphous phase of the core layer. A desirable amount of PE waxes can be added into the core layer and filled into the nanovoids in the amorphous phase of polypropylene. PE waxes can be small crystalline molecules that can crystallize in the nanovoids. If the content of PE waxes in the core layer exceeds a desirable amount, PE waxes could migrate to the surface of the film or equipment (plate-out) as the processing temperature decreases. As the film temperature decreases with cooling, the miscibility of PE waxes in hydrocarbon resin can also decrease. At low wax content, any mobile single wax molecule can move to tunnels connecting the closest PE wax dominated domains and then stack on the surface of PE crystals, forming larger PE wax crystals. PE wax crystals in nanovoids, surrounded by high Tg hydrocarbon resin or PP chain segments constrained from moving due to existing PP crystals and HCR domains, can block the tortuous path of moisture vapor diffusion. Thus, by using a combination of hydrocarbon resin and wax additives, two mechanisms can be exploited to improve moisture vapor barrier properties.

The films disclosed herein can also incorporate at least one layer of polar polymers as a coating/barrier or coextruded layer(s) on the substrate of the coextruded laminate film for improving oxygen gas barrier. Therein, the films can have desirable enhanced barrier properties to both moisture vapor and oxygen gas.

The core layer of the films described herein can comprise a crystalline propylene homopolymer (preferably high crystalline) and a desirable amount of hydrogenated hydrocarbon resins and synthetic polyethylene wax. Suitable examples of highly isotactic crystalline polypropylenes (HCPP) can include LyondellBasell's HP2409, or Phillips 66's CH020XK, Total Petrochemical's LX10903 or 3270 grades. Typically, these HCPP resins can have a melt flow rate in the range of about 1.5 to 3.5 g/10 min., a melting point in the range of about 160-167° C., and a density of about 0.90-0.92 g/cm$^3$. Typical isotactic content of these high crystalline PP resins can be above about 95%, and preferably about 96-98%, measured via $^{13}$C NMR spectra obtained in 1,2,4-trichlorobenzene solutions at 130° C. The % percent isotactic can be obtained by the intensity of the isotactic methyl group at 21.7 ppm versus the total (isotactic and atactic) methyl groups from 22 to 19.4 ppm.

Suitable examples of hydrogenated hydrocarbon resins can include Plastolyn™ R1140 and Eastotac™ H-142W provided by Eastman Chemicals; Oppera™ PR100A provided by ExxonMobil; and Sukorez® SU-640 provided by Kolon Industries. Typically, these hydrocarbon resins can be fully hydrogenated water-white amorphous materials having a softening point of about 130 to 150° C.; a glass transition temperature (Tg) in the range of about 75 to 90° C.; a weight-average molecular weight (Mw) in the range of about 500 to 1000 g/mole; and a polydispersity index (PDI) of about 1.7 to 2.0 as determined using size exclusion chromatography (SEC). The hydrocarbon resins can be derived by thermally polymerizing olefins of aliphatic C5 feedstocks, aromatic C9 feedstocks, or a combination of C5/C9 feedstocks obtained from refinery industries, followed by a process of hydrogenation. The core layer of the films disclosed herein can comprise about 2.5 to 25 wt % of the hydrocarbon resins. Preferably, the content of the hydrocarbon resins is in the range of from about 5 to 15 wt % of the core layer. In some embodiments, the core layer includes at most about 25 wt %, about 20 wt %, about 15 wt. %, about 10 wt. %, about 5 wt. %, or about 2.5 wt. % hydrocarbon resins.

Suitable examples of waxes can include synthetic polyethylene waxes, paraffin waxes, and Fischer Tropsch waxes, which can have a melting temperature (Tm) in the range of about 60 to 95° C. and a number-average molecular weight in the range of about 400 to 655 g/mole. Preferably, the melting point can be in the range of about 65 to 92° C. Characteristics of the wax additives can include an ethylene backbone and highly crystalline aptitude. Examples can include synthetic polyethylene waxes provided by Baker Hughes such as Polywax™ 400, Polywax™ 500, Polywax™ 600, and Polywax™ 655. Other examples of polyethylene wax can be synthetic paraffin wax products, such as grades of WAX #178P, WAX #275P, and WAX #504 provided by Koster Keunen. More examples of polyethylene waxes can be crystalline Fischer Tropsch waxes, such as Sasolwax® C80 (Tm=ca. 80 to 85° C.) provided by Sasol Wax North America Corporation. The core layer of the films disclosed herein can comprise about 0.5 to 2.0 wt % of synthetic polyethylene wax. Preferably, the PE wax in the core layer can be in the range of about 0.75 to 1.5 wt %. In some embodiments, the core layer includes at most about 2 wt %, about 1.75 wt %, about 1.5 wt. %, about 1.25 wt. %, about 1 wt. %, about 0.75 wt. %, or about 0.5 wt. % synthetic polyethylene wax.

The core layer of the films disclosed herein can thus comprise high crystalline propylene homopolymer, hydrocarbon resin, and polyethylene wax to provide a transparent, high moisture vapor barrier propylene-based and oriented film.

The outer skin layers of the laminate films disclosed herein can include polyolefin resins for the application of heat-sealing, winding, adhesion, or printing. These skin layers can be coextruded with the core layer to form coextruded laminate films. The polyolefin resins can include ethylene homopolymer, propylene homopolymer, ethylene or propylene-based copolymers and terpolymers (e.g. ethylene-propylene, ethylene-butene, propylene-butene, ethylene-propylene-butene), or blends thereof. Modified polar polyolefin resins such as grafted polar polyolefins or copolymerized polar polyolefin resins can be added into the outer layers to promote adhesion, particularly as a tie-resin or tie-layer for receiving polar polymer coatings or coextruded layers.

Polar polymers as coatings or coextruded layers can be applied to a tie-layer bonded to a polypropylene-based substrate through an inline or offline process for improving oxygen gas barrier. The polar polymers can include ethylene vinyl alcohol (EVOH), polyvinyl alcohol (PVOH), or modified polyvinyl alcohol/polyvinyl amine copolymer (PV-Am), and polyhydroxyaminoether (PHAE) or other polar polymers with high oxygen barrier properties, and blends thereof. The layer of polar polymers can be cross-linked to lessen the moisture absorption and swelling due to strong polar molecular attractions. Cross-linking of EVOH, PVOH, PV-Am (or blends thereof) or other polar polymers by crystallites or chemical reaction can eliminate the swelling or plasticization of moisture vapor/water to the film structure. Examples of oxygen barrier coating compositions can include the solutions of Selvol™ (aka Celvol®) 502 PVOH resin provided by Sekisui Specialty Chemicals of America, LLC.; Excelval® RS-2117 EVOH resin provided by Kuraray America Inc.; Freechem® 40 DL glyoxal cross-linker provided by Emerald Performance Materials; solutions of PVOH/PVA Selvol™ Ultiloc® 5003 BRS polyvinyl alcohol-polyvinyl amine (PV-Am) copolymer provided by Sekisui Specialty Chemicals; Polycup® 9200 epichlorohydrin, provided by Hercules, Inc., and citric acid provided by Duda Energy, LLC, as suitable crosslinkers for the PV-Am. Examples of coextrudable EVOH resins can include modified EVOH resin with ethylene content in the range of 27 to 48 mol %, preferably 38 to 48 mol %, such as Soarnol™ EVOH grades provided by Nippon Gohsei.

An optional but desirable amount of fluoropolymer additive can be included in the core layer to improve the distribution of PE waxes and help the moisture vapor barrier. The content of the fluoropolymer additive can be in the range of about 100-1000 ppm of the core layer, preferably about 300-600 ppm of the core layer. This fluoropolymer can be typically available as a processing aid in a masterbatch form and can be typically polymerized from two monomers—hexafluoropropylene and vinylidene fluoride—to form a poly(vinylidene) fluoride-co-hexafluoropropylene polymer (1,1-difluoroethylene-1,1,2,3,3,3-hexafluoro-1-propene copolymer). This fluoropolymer typically can have a weight average molecular weight $M_w$ of about 400,000 to 455,000 g/mol; a number average molecular weight $M_n$ of about 110,000 to 130,000 g/mol; a melting point of about 135-140° C.; a melt flow rate of about 4-10 g/10 min. at 230° C.; a viscosity of about 20,000 to 25,000 poise at 230° C. and 100 $sec^{-1}$; and a density of about 1.78 $g/cm^3$. A suitable supplier of the fluoropolymer masterbatch is Ampacet Corporation with suitable grades such as Ampacet 401198 (a 3 wt % loading of fluoropolymer in a propylene homopolymer carrier resin) or Ampacet 402810 (a 5.0 wt % loading of fluoropolymer in a propylene homopolymer carrier resin). These masterbatches typically can have a density of about 0.90-0.92 $g/cm^3$ and a melt flow rate of 3-12 g/min. at 230° C.

In some embodiments, the laminate film can comprise a first layer (A), a core layer (B), a second skin layer (C), and a polar polymer coating layer (D). The first layer (A) and the second skin layer (C) can be coextruded onto the sides of the core layer (B); a typical configuration is to have the skin layers (A) and (C) each on opposite surfaces of the core layer (B). A layer of polar polymers (D) can be coated on the first layer (A) opposite the second skin layer (C) through said inline or offline coating process. In this case, the first layer (A) is a tie-layer, and the polar coating layer (D) is an outer layer and provides the afore-mentioned high oxygen gas barrier property. In some embodiments, the film comprises only core layer (B). In some embodiments, the film comprises core layer (B) and first layer (A). In some embodiments, the film comprises core layer (B) and second skin layer (C). In some embodiments, the film comprises core layer (B), first layer (A), and second skin layer (C). In some embodiments, the film comprises core layer (B) and polar polymer coating layer (D), wherein polar polymer coating layer (D) is coated on a surface of core layer (B). In some embodiments, the film comprises core layer (B), first layer (A), and polar polymer coating layer (D), wherein polar polymer coating layer (D) is coated on first layer (A). In some embodiments, the film comprises core layer (B), second skin layer (C), and polar polymer coating layer (D), wherein polar polymer coating layer (D) is coated on a surface of the core layer (B) opposite second skin layer (C). In some embodiments, the first layer (A) and/or second skin layer (B) are not co-extruded with the core layer. In some embodiments, polar polymer layer (D) can also be coextruded with the core layer. In some embodiments, there are two polar polymer layers (D), one on each side of the core layer. The multiple polar polymer layers can also be on a surface of a tie layer that is on a surface of the core layer.

The first layer (A) can comprise an isotactic propylene homopolymer or "mini-random" ethylene-propylene copolymer (an EP copolymer with a fractional amount of ethylene content, e.g. less than 1 wt % ethylene co-monomer, preferably about 0.3-0.6 wt %) or maleic anhydride-grafted (MAH-g) polyolefins, or blends thereof. A composition blended with a desirable amount of MAH-g-polypropylene can enhance the bond adhesion between the layer (A) and polar coatings or inks compared to that with no added polar polymeric compatibilizer. The core layer (B) can comprise highly isotactic highly crystalline polypropylene, synthetic polyethylene wax, hydrocarbon resin, and an optional fluoropolymer additive. Upon one side is contiguously attached the first layer (A), and upon the other side is contiguously attached the second skin layer (C) with functionalities of heat sealing or winding, etc. as desired. The second skin layer (C) can comprise a blend of heat sealable ethylene-propylene-butene terpolymer, ethylene-propylene copolymer, propylene-butene copolymer, or blends thereof.

The core layer (B) can include a desirable amount of crystalline polyethylene wax in an amount of about 0.5-2.0 wt % of the core layer. Preferably, the amount of crystalline polyethylene can be between about 0.75-1.5 wt % of the core layer. Suitable crystalline polyethylene waxes can include wax grades available from Baker Hughes and Koster Keunen as previously described in the art. High wax content in the core layer can be undesirable (e.g. greater than about 3 wt %) since the miscibility of PE waxes in the hydrocarbon resin phase and amorphous PP segments decreases with cooling temperature such that wax migration and plate-out on processing equipment can occur.

A desirable amount of hydrocarbon resin can also be included in the core layer to further improve moisture barrier properties. Hydrocarbon resin can also help in orientation of stretching the high crystalline polypropylene and in preventing uneven stretch and film breaks. Suitable loadings of hydrocarbon resin can be up to about 25 wt % of the core layer. Preferably, hydrocarbon resin in the core layer can be in the range of about 7.5-15 wt % to achieve the optimal balance of high content of PP crystals and low free volume in the amorphous phase of the core layer. The optimal balance can be evidenced by the saturation in moisture vapor barrier of the laminate films. The suitable hydrocarbon resins should be fully hydrogenated after polymerization. Examples of suitable hydrocarbon resins can include ExxonMobil Oppera™ PR100A, Eastman Chemical company's Plastolyn™ R1140 and Eastotac™ H-142W, and Kolon Industries' Sukorez® SU-640 as described previously.

A desirable optional amount of fluoropolymer additive can be also included in the core layer to help distribute PE waxes and further enhance the moisture vapor barrier. A desirable amount of optional fluoropolymer additive can be about 100-1000 ppm of the core layer, preferably about 300-600 ppm of the core layer.

The outermost skin layers (A and C) on both sides of the core layer (B) can have a thickness after biaxial orientation between about 0.1 and 5 μm, preferably between about 0.5 and 3 μm, and more preferably between about 0.5 and 1.5 μm. It is well-known to those skilled in the art that there can be a need to add inorganic or organic anti-blocking agents into the outermost skin layers to improve processability in film-making and handling. A desirable amount of anti-blocking agents may be added up to about 10,000 ppm to these outer layers, depending on their functionality. Preferably about 300-5000 ppm of anti-blocking agents may be added. Suitable inorganic anti-blocking agents can include those such as inorganic silicas and sodium calcium aluminosilicates. Suitable organic anti-blocking agents can include those such as cross-linked spheres of polymethylsilsesquioxane and polymethylmethacrylate. Typically, useful particle sizes of these anti-blocking agents can be in the range of about 1-12 μm, preferably in the range of about 2-4 μm. Suitable anti-blocking agents may also include migratory slip agents. Examples of migratory slip agents can include fatty amides and silicone oils of low molecular weight molecules, and/or combinations thereof. Examples of—but not exclusive of—fatty amides can be stearamide, erucamide, behenamide, and/or combinations thereof.

If the second outer skin layer (C) of the films are to be heat sealable, the heat-sealable layer can be any polyolefin that has a lower melting point than that of the isotactic crystalline propylene-based resin of the core layer. Such polyolefins can include polyethylene, copolymers of propylene, ethylene, butene, and blends thereof. Preferably, the polyolefin can be a copolymer of propylene, either ethylene-propylene or butylene-propylene, and preferably comprises a ternary ethylene-propylene-butene copolymer, or blends thereof. Examples of suitable heat-sealable terpolymer resin can include Sumitomo SPX78R6 and WF345R2 which have a melt flow rate of about 9 g/10 min. at 230° C. and a melting temperature of about 128 to 134° C. Examples of suitable heat-sealable ethylene-propylene copolymers can include Total 8573 with a melt flow rate of about 8 g/10 min. at 230° C., ExxonMobil Vistamaxx™ 3588FL with a melt flow rate of about 9 g/10 min. at 230° C., or LyondellBasell Adsyl™ 7416 XCP with a melt flow of about 7.5 g/10 min. at 230° C.

If the second outer skin layer (C) of the films is not designed for heat sealing but for winding purposes, this layer can comprise a crystalline polypropylene or a blend of polypropylene and ethylene-propylene copolymer with anti-blocking and/or slip additives. Preferably, the surface of the winding layer can be corona discharge-treated to provide a functional surface with higher surface energy for lamination or coating with adhesives and/or inks.

Additionally, the second outer layer (C) can also be formulated to have a matte finish by adding a block copolymer blend of polypropylene and one or more other polymers (e.g. polyethylene) to provide a roughened and low gloss surface during the step of film formation. This matte surface can also be corona discharge-treated as desired, or could also be formulated with propylene copolymers to impart a heat sealable matte layer. Antiblock and slip additives as described previously may also be added to this layer for control of coefficient of friction (COF).

In some embodiments, the films or coextruded films can be five-layered films comprising a core layer (B) blended with HCPP, HCR, PE waxes, and an optional polar polymer compatibilizer. Preferably, the compatibilizer can be a maleic anhydride-grafted polypropylene resin. Additionally, two intermediate layers (E) of polar polymers for oxygen gas barrier properties can be on each surface of the core layer (B), and two outermost layers (F and G) can be on each surface of an intermediate layers (E) opposite the core layer (B). The layers (F and G) can be formulated for the purpose of printing, adhesion, winding, heat sealing, and coating, etc. The two polar polymer layers (E) can provide oxygen barrier and block the potential of any migrations of wax molecules to the outermost surfaces of the films.

For a typical 3-layer coextruded film embodiment as described previously, the coextrusion process can include a three-layered compositing die. The polymeric core layer (B) can be sandwiched between the skin layer (A) and the heat-sealable or winding layer (C). The outer layer (A) of a three layer laminate sheet can be cast onto a chilling or casting drum with a controlled temperature in the range of ca. 15 to 45° C. to solidify the non-oriented laminate sheet, followed by a secondary cooling on another chilling drum with a controlled temperature. The non-oriented laminate sheet can be stretched in the machine direction at about 95 to 165° C. at a ratio of about 4 to 6 times of the original length and then heat set at about 50 to 100° C. to obtain a uniaxially oriented laminate sheet with minimal thermal shrinkage. The uniaxially oriented laminate sheet can be introduced into a tenter and preliminarily heated between about 130° C. and 180° C., stretched in the transverse direction at a ratio of about 7 to 10 times of the original length, and heat-set to give a biaxially oriented sheet with minimal thermal shrinkage. This biaxially oriented sheet may be used in a process of offline coating to impart the oxygen barrier polar polymer coating upon the desired side of the sheet for the resultant laminate film for moisture vapor and oxygen gas barrier final product. If a process of inline coating is used for the resultant laminate film, the inline coating station can be typically and preferentially located between the machine direction orientation unit and the transverse direction orientation unit (tenter). The MD-oriented sheet's surface of the outer layer of the first layer (A) of the laminate can be preferably corona discharge-treated to raise surface energy. A stretchable aqueous coating of the desired polar polymer can be provided by the inline coater through a process of gravure coating or rod coating (or other wet coating means well known in the art). It can then be added onto the (optionally) discharge-treated outer surface of the first layer (A). The wet-coated uniaxially oriented laminate sheet can be introduced into a tenter and preliminarily heated between about 130° C. and 180° C., stretched in the transverse direction at a ratio of about 7 to 10 times of the original length, and heat-set to give a biaxially oriented sheet with minimal thermal shrinkage. The tenter oven can also function as a means to dry the aqueous coating. The dried polar polymer coating can be typically about 0.1-2.0 G (0.025-0.5 µm) in thickness, preferably about 0.5-1.0 G (0.125-0.25 µm). The overall coated and biaxially oriented film can have a total thickness between about 10 and 60 µm, preferably between about 15 and 25 µm.

The films disclosed herein can be better understood with reference to the following examples, which are intended to illustrate specific embodiments within the overall scope of the invention.

Example 1

Example 1 represents a comparative example to describe the experimental conditions of making the same. A 3-layer coextruded film was made on a nominal 1.6 m wide biaxial orientation line, comprising of a core layer (B), a skin layer (A) on one side of the core layer, and a heat-sealable skin layer (C) on the other side of the core layer opposite that of the skin layer (A). The core layer comprised of about 100 wt % Total Petrochemical Co.'s LX10903 HCPP resin. The skin layer (A) comprised of about 99.4 wt % Admer® QF500A MAH-g-PP supplied by Mitsui Chemical Corporation and about 0.6 wt % ABVT19NSC antiblock masterbatch purchased from A. Schulman. (ABVT19NSC is masterbatch of Silton® JC-30 in ethylene-propylene copolymer with a blend ratio of 5/95 respectively. Silton® JC 30 is an anti-blocking agent with nominal 3 µm particle size of a spherical sodium calcium aluminum silicate manufactured by Mizusawa Industrial Chemicals, Co., Ltd.) The skin layer (C) is comprised of about 100 wt % of ethylene-propylene-butene terpolymer sealant Sumitomo SPX78R6 which also contained about 4000 ppm of a nominal 2 µm particle size of a spherical cross-linked silicone polymer (Momentive Performance Materials' Tospearl® 120). The total thickness of this 3-layer coextruded film substrate after biaxial orientation was nominal 70 G (17.5 m). The thickness of the skin layer (A) and sealant skin layer (C) after biaxial orientation was nominal 4 G (1 µm) and 6 G (1.5 m), respectively. The thickness of the core layer (B) is nominal 60 G (15 µm). The skin layer (A) and core layer (B) were melt-extruded at about 230-260° C. The sealant layer (C) was melt-extruded at 230-255° C. The 3-layer coextrudate was passed through a flat die to be cast on a chill drum of about 20-26° C. The formed cast sheet was passed through a series of heated rolls at about 100-124° C. with differential speeds to stretch in the machine direction (MD) to a 4.75 stretch ratio. This was followed by transverse direction (TD) stretching to an 8.0 stretch ratio in the tenter oven at about 150-170° C. in a tenter oven. Inside the tenter oven, there are three zones for the purposes of heating, stretching and heat-setting. The temperatures of first, second and third zones are ca. 165, 155, and 150° C., respectively. After transverse stretching, the film was heat-set in the third zone to minimize thermal shrinkage, followed by a 5% relax in the transverse direction. The resultant laminate film was corona discharge-treated upon the surface of the outer layer opposite the outer skin layer (C) before it was wound into a roll form. The film was then tested for appearance, optical properties, oxygen gas/moisture vapor barrier properties. The film was also forced-heat-aged by placing it in a conditioning oven at an elevated temperature of about 50° C. for 12 hrs in order to further reduce the free volume in the amorphous phase of the core layer.

The three layer film was tested for barrier properties as shown in Table 1. The sample has a poor moisture vapor transmission rate of about 0.340 g/100 in$^2$/day before aging, and about 0.321 g/100 in$^2$/day after aging, respectively. Aging the film sample did not significantly improve the moisture vapor barrier. The sample also had a poor oxygen transmission rate of about 115 cc/100 in$^2$/day. The O2TR barrier was tested without aging the sample.

Examples 2-4

Example 2 was made using the same conditions as that of Example 1. However, the recipe of the core layer was changed to comprise about 90 wt % Total LX10903 HCPP resin and about 10 wt % Oppera™ PR100A hydrocarbon resin (HCR, supplied by ExxonMobil). The hydrocarbon resin was compounded into a masterbatch with Total LX10903 HCPP resin at a ratio of 50/50 for easily feeding into the hopper of an extruder.

Table 1 indicates that the resultant laminate film with 10% HCR in the core layer (Ex 2) has an oxygen gas transmission rate of about 82.4 cc/100 in$^2$/day and a moisture vapor transmission rate of about 0.231 g/100 in$^2$/day. The oxygen barrier is about 1.4 times better than the comparative film made in Example 1 and the moisture vapor is about 1.5 times better than the comparative film of Example 1.

Examples 3-4 present a process to prepare coated films by coating a polar polymeric layer (D) on the outer surface of the layer A of Example 2 through inline gravure coating after machine direction orientation (base film recipe was listed in Table 1). The exposed surface of uniaxially oriented film was corona discharge-treated first and then an aqueous liquid coating solution for improving oxygen barrier properties was continuously coated onto the treated surface of the layer (A) of Example 2 (base film) using a direct gravure roll coating system 45 BCM (billion cubic microns). The sheet with coated solution on it then was fed at a line speed of about 15.5 ft/min. into a tenter oven with three temperature control zones. The wet coating was dried to remove solvent water in the pre-heating zone with a temperature range measured in the range of about 80 to 90° C. The dried barrier coating layer after further heating was stretched to about 8.0 times of the initial dimension in transverse direction. Coating weight (thickness) can be controlled by adjusting the solid content of the coating solution according to machine engraving coating chart. In this BOPP film, B5K and B18 are examples of polar polymeric coating compositions that were used to improve oxygen barrier properties. A coating thickness of about 0.70 G (0.175 μm) after TD stretch was targeted for all coated films to achieve an optimal balance in cost and barrier performance.

B5K is an oxygen barrier coating solution of a composition after drying of about 58.6 wt % polyvinyl alcohol (Selvol™ 502 PVOH resin provided by Sekisui Specialty Chemicals of America), about 28.25 wt % ethylene vinyl alcohol (Excelval® RS-2117 EVOH resin provided by Kuraray America Inc.), about 12.27 wt % glyoxal (Freechem® 40 DL cross-linker provided by Emerald Performance Materials), and about 0.87 wt % defoamers/surfactants (Surfynol® 420 anti-foamer/leveling surfactant provided by Air Products and Chemicals, Inc.). B18 is another oxygen barrier coating solution of a composition after drying of about 84.63 wt % PVOH/PVA (Selvol™ Ultiloc® 5003 BRS, provided by Sekisui Specialty Chemicals of America, Dallas, Tex.), about 0.85 wt % epichlorohydrin (Polycup® 9200 epichlorohydrin, provided by Hercules, Inc.), and about 13.82 wt % citric acid (food grade, provided by Duda Energy, LLC), and about 0.71 wt % defoamers/surfactants (Surfynol® 420 anti-foamer/leveling surfactant provided by Air Products and Chemicals, Inc.).

After coated with the polar polymeric barrier coating, the resultant laminate films showed significant improvements in oxygen gas barrier properties. The oxygen gas transmission rates of the resultant films coated with B5K and B18 are about 1.67 cc/100 in$^2$/day and about 0.035 cc/100 in$^2$/day, respectively. These values of oxygen transmission rates are two orders of magnitude for B5K and four orders for B18 better than that of the uncoated base film (Example 2). B18 coating composition in oxygen barrier improvement is further significantly better than B5K. However, no significant moisture vapor barrier improvement was observed for these coated film Examples 3 and 4 in comparison with the MVTR values of uncoated film (Example 2) measured before and after aging.

Examples 5-10

Examples 5-10 were made using the same conditions as that of Examples 3 and 4. There was no change in the layers of (A), (C) and (D). The composition of the core layer (B) was changed to improve moisture vapor barrier properties. The core layer comprised of about 10 wt % Oppera™ PR100A, about 1.0 wt % synthetic polyethylene wax (PE wax), and about 600 ppm fluoropolymer additive (shown in Table 1). The content of Total LX10903 HCPP resin was adjusted accordingly to match a total weight ca. 100% in the core layer. The synthetic polyethylene wax additives are Baker Hughes Polywax™ 400 (Tm=ca. 81° C.), 500 (Tm=ca. 88° C.), and 655 (Tm=ca. 99° C.), respectively. The wax additives were compounded into a masterbatch with Total LX10903 HCPP resin at a ratio of 25/75 for easily feeding into the hopper of the core layer. The fluoropolymer additive in this invention was used as a masterbatch (gradename 402810) obtained from Ampacet which contains 5 wt % fluoropolymer and 95 wt % ethylene-propylene copolymer.

The resultant laminate films demonstrated a significant moisture vapor barrier improvement in comparison with the MVTR values of the films in Examples 2-4. Specifically, the moisture vapor barrier properties were further improved by heat aging the films at elevated temperature of about 50° C. for about 12 hrs. The improvement of PE wax additives to the moisture vapor barrier follows the order of wax molecular weight of the Polywax™ grades 400>500>655, probably due to the order of the increasing crystallization temperature (Tc) of the PE waxes. The Polywax™ 400 has the lowest Tc at ca. 73° C. (peak temperature) which is the closest to the aging temperature of about 50° C. (the crystallization of Polywax™ 400 starts at around 50° C.). For the wax additives with higher Tc, increasing aging temperature helped decrease the MVTR of the resultant film due to the formation of more perfect PE wax crystals at higher aging temperature. As expected, the oxygen gas barrier properties of the resultant films coated with B5K or B18 were not improved by adding PE wax and fluoropolymer additives in the core layer. The thickness and performance of polar polymeric coatings dominated the oxygen gas barrier properties of the resultant laminate films.

Comparative Examples 1-3

Comparative Examples (CEx) 1-3 were made using the same conditions as that of Examples 5-10. The composition of the core layer (B) was changed to evaluate the influence of fluoropolymer additive on the moisture vapor barrier properties of the resultant laminate films. The PE wax additive in the core layer of all Comparative Examples 1-3 was about 1.0 wt % Polywax™ 500. The Comparative Example 1 comprised of about 600 ppm fluoropolymer in the core layer while the Comparative Examples 2-3 did not contain fluoropolymer additive (as shown in Table 1).

The resultant laminate films with added fluoropolymer additive in the core layer did not show significant improvements in moisture vapor barrier properties, by comparing the MVTR of Ex 7, Ex 8, and CEx 1 with that of CEx 2 and CEx 3. All examples after forced heat-aging had a value of MVTR in the range of about 0.153 to about 0.161 g/100 in$^2$/day.

Examples 11-16

A process similar to Example 3 was repeated to make nominal 80 G (20 μm) laminate films (Ex 11-16 shown Table 2). The thickness of the core layer was increased from nominal 60 G to 70 G (15-17.5 μm), therein, the resultant laminate films have total thickness of nominal 80 G (20 μm). The recipe of the core layer (B) for this set of experiments is listed in Table 2 except for a small variation in the content of Total LX10903 HCPP resin to match a total weight ca. 100 wt % in the core layer. B18 was the only barrier coating solution used to coat the uniaxially oriented laminate film.

As expected, a thicker core layer (70 G or 17.5 μm) of the resultant films provided a better moisture vapor barrier in comparison with that of 60 G (15 μm) core layer in the art. Example 12 showed a typical MVTR value (about 0.175 g/100 in$^2$/day) for the type of laminate films with HCR modification but no PE wax additive added into the core layer. After heat aging, the MVTR was only slightly reduced to the value of about 0.172 g/100 in$^2$/day. If about 1.0 wt % Polywax™ 400 was added into the core layer (Ex 12), the MVTR of the resultant laminate film was reduced to about 0.159 g/100 in$^2$/day before aging and about 0.131 g/100 in$^2$/day after nominal 50° C. and 12 hrs heat-aging, respectively. For comparison, fluoropolymer additive and polar polymeric coating did not show good improvements in the moisture barrier of the resultant laminate film as shown in Ex 13 and Ex 14. Similar reduction in MVTR values was also observed for the resultant laminate film with ca. 1.0 wt % Polywax™ 500 added into the core layer (Ex 15 and Ex 16).

Comparative Examples 4-5

A process similar to Example 12 was repeated to make the nominal 80 G (20 μm) resultant laminate films (CEx 4 and CEx5). The recipe of the core layer (B) comprised of about 3000 ppm fluoropolymer additive (about 6 wt % Ampacet 402810 masterbatch in the core layer), about 10 wt % Oppera™ PR100A hydrocarbon resin, and about 84 wt % Total LX10903 HCPP resin. There was no PE wax additive added into the core layer. A base film was made and then B18 barrier coating solution was used to coat the uniaxially oriented laminate film after MDO.

As shown in Table 2, the MVTR (about 0.195 g/100 in$^2$/day) of the resultant films with added 3000 ppm fluoropolymer additive but no added PE wax additive (CEx 4 and CEx 5) was slightly higher than the MVTR (about 0.175 g/100 in$^2$/day) of the control film (Ex 12) before heat-aging. After heat-aging, the resultant films showed some improvements in moisture vapor barrier according to the result of about 0.146 g/100 in$^2$/day for uncoated film or about 0.164 g/100 in$^2$/day for coated film. The extent of MVTR improvement after force-aging was comparable with that obtained from Polywax™ 500 at about 1.0 wt % loading.

Examples 17-24

A process similar to Example 12 was repeated to make the nominal 80 G (20 μm) resultant laminate films of Examples 17-24 shown in Table 3. The recipe of the core layer (B) comprised of about 10 wt % Oppera™ PR100A but no fluoropolymer additive. The content of Polywax™ 400 in the core layer varied in the range of about 0 wt % to about 2.0 wt %. LX 10903 HCPP resin was added to match a total weight ca. 100% in the core layer. A base film was made and then B18 barrier coating solution was used to coat the uniaxially oriented laminate film after MDO.

As shown in Table 3, the MVTR of the resultant laminate films was significantly reduced from about 0.175 g/100 in$^2$/day (Ex 17, no wax) to about 0.098 g/100 in$^2$/day (Ex 24, 2.0 wt % Polywax™ 400) with increasing content of Polywax™ 400. After heat aging (ca. 50° C./12 hrs), the MVTR of the resultant laminate films was reduced to a lower value of about 0.074 g/100 in$^2$/day. However, the O2TR of the coated resultant laminate films was slightly increased from about 0.36 cc/100 in$^2$/day to about 1.2 cc/100 ln$^2$/day with increasing content of Polywax™ 400 in the core layer, which was probably due to the formation of pin holes in the coating layer potentially caused by light wax migration. No obvious hazy spots underneath the polar polymeric coating layer were observed for those coated films with Polywax™ 400 additive, the extent of wax migration should be at a low level which does not impact the appearance of the resultant laminate films.

Examples 25-26

A process similar to Example 12 was repeated to make the nominal 80 G (20 μm) resultant laminate films of Examples 25-26 shown in Table 3. The recipe of the core layer (B) comprised of about 10 wt % Oppera™ PR100A and about 1.5 wt % Polywax™ 500 and about 88.5 wt % LX 10903 HCPP resin. Oxygen gas barrier coating solution was B18.

Before heat aging, the MVTR of the resultant laminate films was reduced slightly from about 0.175 g/100 in$^2$/day (Ex 17) to about 0.157 g/100 in$^2$/day (Ex 25). After heat aging (50° C./12 hrs), the MVTR of the resultant laminate film was reduced to a significantly low level in the range of about 0.102-0.117 g/100 in$^2$/day. The O2TR of the coated laminate film with added 1.5 wt % Polywax™ 500 was comparable to that of the coated laminate film with added Polywax™ 400. The appearance of the coated laminate film was comparable to that of the uncoated laminate films with added Polywax™ 500.

Comparative Examples 6-9

A process similar to Example 23 was repeated to make the nominal 80 G (20 μm) resultant laminate films of CEx 6-9 shown in Table 3. The recipe of the core layer (B) comprised of about 2.0 wt % Polywax™ 400 (CEx 6 and CEx 7) and Polywax™ 500 (CEx 8 and CEx 9), respectively. LX 10903 HCPP resin in the core layer was about 98 wt %. No hydrocarbon resin was added into the core layer. A base film was made and the oxygen gas barrier coating solution B18 was coated on the base film after MDO.

The two uncoated base films (CEx 6 and CEx 8) had good appearance and showed no hazy wax spots, while hazy wax spots were observed for the two coated films (CEx 7 and CEx 9). Both Polywax™ 400 and 500 waxes migrated to the top surface of the uncoated films in the tenter oven, and then after migration, the waxes vaporized (smoked in the TD stretch oven), giving a clear appearance. No hazy wax spots could be seen for those uncoated films. With a polar top coating (a capping layer (D)) over the top surface of the layer (A), the top polar coating blocked the pathways of the vaporization of the migrated wax molecules trapped in between the layer (A) and layer (D), wax molecules formed crystals which could be seen visually and led to a poor appearance to the resultant laminate films. Without hydrocarbon resin in the core layer, PE wax molecules could more easily migrate to the top surface of the resultant laminate films in the tenter oven, leading to the formation of hazy wax crystals seen for the coated laminate films.

As is evidenced by the results in Table 3, the MVTR of the coated and uncoated resultant laminate films with about 2.0 wt % Polywax™ 400 or 500 in the core layer showed very limited improvements in the moisture barrier properties in comparison with the MVTR of Ex 1 (about 100 wt % HCPP resin in the core layer) before heat aging. After heat aging, the MVTR of the resultant films was about 0.150 g/100 in$^2$/day for CEx 7 (2.0 wt % Polywax™ 400) and to about 0.199 g/100 in$^2$/day for CEx 9, (2.0 wt % Polywax™ 500), respectively. Polywax™ 400 had slightly better effects on the moisture vapor barrier improvement than Polywax™ 500. The MVTR values of those films with only PE wax additives in the core layer were much higher than that of the resultant laminate films with a combination of hydrocarbon resin and PE waxes in the core layers. The O2TR of the coated resultant films were about twice higher than that of the resultant film with added hydrocarbon resin in the core layer (Ex 24) due to pin holes induced from severe wax migration.

Examples 27-35

A process similar to Example 18 was repeated to make the nominal 80 G (20 μm) resultant laminate films of Examples 27-35 shown in Table 4. The recipe of the core layer (B) comprised of about 10-12.5 wt % hydrocarbon resin (ExxonMobil Oppera™ PR100A, HCR) or about 10.0 wt % hydrocarbon resin (Eastman Eastotac™ H-142W, named as HCR1 in Table 4). The content of synthetic polyethylene waxes in the core layer was in the range of from about 0.5 to 1.5 at %, selected from Polywax™ 400, 500 and 600 supplied by Bake Hughes or synthetic paraffin wax Wax#178P (Tm=ca. 78-83° C.) and WAX #201P (Tm=ca. 96-100° C.) supplied by Koster Keunen. Both hydrocarbon resins and waxes were compounded into a masterbatch with Total LX10903 HCPP resin at a ratio of 50/50 and 25/75, respectively, for easily feeding into the hopper of an extruder. Oxygen gas barrier coating solution was B18.

As shown in Table 4, the resultant laminate film of Ex 27 with ca. 12.5 wt % Oppera™ PR100A in the core layer, higher than the ca. 10.0 wt % HCR content of Examples Ex 11 and 17, does not show moisture barrier improvement before aging. After aging, the MVTR of resultant laminate film was reduced slightly from about 0.184 to about 0.164 g/100 in$^2$/day. Increasing the content of Polywax™ 400 from about 0.0 to about 0.5-1.0 wt %, the MVTR of the resultant films of Examples Ex 28 and Ex 29 was reduced from about 0.184 to about 0.176-0.159 g/100 in$^2$/day, especially, after the laminate films were heat aged at ca. 50° C. for about 12 hrs, the MVTR of the resultant laminate films was reduced further from about 0.164 to about 0.136-0.124 g/100 in$^2$/day. The O2TR of the resultant laminate films of Examples Ex 27, Ex 28 and Ex 29 was reduced slightly with increasing wax content in the core layer.

In Ex 30 and Ex 31, the hydrocarbon resin in the core layer was replaced by about 10.0 wt % Eastotac™ H-142W, and the content of Polywax™ 500 varied from about 1.0 to 1.5 wt %. The MVTR of the resultant laminate films was higher than that of Ex 27 to 29 as shown in Table 4, however, after heat aging at 50° C. for about 12 hrs, the MVTR of the resultant laminate films was reduced to a significant low level of about 0.151 and 0.128 g/100 in/day, respectively. To compare with Ex 30, the hydrocarbon resin of Ex 32 was changed to about 10.0 wt % Oppera™ PR100A. The MVTR of the resultant laminate film of Ex 32 was slightly lower than that of Ex 30 before heat aging, however, the MVTR of Ex 30 and Ex32 showed little difference after heat aging. The O2TR of the resultant laminate films of Ex 30 and Ex 31 increased about one fold with increasing wax content in the core layer.

In Ex 33 to 35, the core layer contained ca. 10.0 wt % hydrocarbon resin Oppera™ PR100A, and ca. 1.5 wt % wax additive selected from Polywax™ 600 and synthetic paraffin WAX #178P and WAX #201P provided by Koster Keunen. The MVTR of the resultant laminate films after heat aging was significantly reduced to about 0.140, 0.128 and 0.141 g/100 in$^2$/day, respectively. The O2TR of the resultant laminate films was reduced to the range of from about 0.026 to 0.041 cc/100 in$^2$/day.

Optical properties of all resultant laminate films in the art depended on the recipes and experimental condition setup of each set of experiment. The data of optical properties of the resultant laminate films shown in each table was obtained from measuring the film samples made with the same single experiment setup, starting with a control example listed on the top of each table. No attempts were applied to improve the optical properties of each example during the process of making the same. No obvious wax hazy spots underneath the polar polymeric coating layer were observed for those coated films with both wax additive and hydrocarbon resin in the core layer, wax migration at a level did not appear to impact the appearance of the resultant laminate films. However, without adding hydrocarbon resin into the core layer, heavy hazy wax spots underneath the polar polymeric coating layer due to wax migration were observed for the coated resultant films.

Thus, Applicants have discovered a solution to provide significantly improved moisture vapor barrier and oxygen gas barrier for transparent BOPP films by utilizing a combination of hydrocarbon resin, crystalline polyethylene wax, and polar polymeric barrier coatings. Such an inventive combination of additives also maintained high transparency (low haze), high gloss, and good printability, and wetting tension properties of the film.

The barrier properties of the Examples ("Ex") and Comparative Examples ("CEx") are shown in Tables 1, 2, 3 and 4. Table 1 summarizes the core layer formulations, oxygen barrier coatings, moisture vapor transmission rate (MVTR), oxygen gas transmission rate (O2TR) and optical properties of the nominal 70 G (17.5 μm) resultant laminate films of Examples 1-10 and Comparative Examples 1-3. Table 2 summarizes the core layer formulations, oxygen barrier coatings, moisture vapor transmission rate and optical properties of the nominal 80 G (20 μm) resultant laminate films of Examples 11-16 and Comparative Examples 4-5. Table 3 summarizes the core layer formulations, oxygen barrier coatings, moisture vapor transmission rate, oxygen gas transmission rate and optical properties of the resultant laminate films of Examples 17-26 and Comparative Examples 6-9. Table 4 summarizes the core layer formulations, oxygen barrier coatings, moisture vapor transmission rate and optical properties of the resultant laminate films of Examples 27-35.

TABLE 1

| Example | HCR (%) | Polywax 400 (%) | Polywax 500 (%) | Polywax 655 (%) | FP (ppm) | Coating | MVTR (g/100 in$^2$/day) | MVTR (g/100 in$^2$/day) aged at 50° C./12 hrs | O2TR (cc/100 in$^2$/day) | Gloss (60°) cast side | Gloss (20°) sealant side | Haze |
|---|---|---|---|---|---|---|---|---|---|---|---|---|
| Ex1 | 0 | | | | | | 0.345 | 0.321 | 115 | 120 | 86 | 2.9 |
| Ex2 | 10 | | | | | | 0.231 | 0.223 | 82.4 | 119 | 77 | 4.6 |

TABLE 1-continued

| Example | HCR (%) | Polywax 400 (%) | Polywax 500 (%) | Polywax 655 (%) | FP (ppm) | Coating | MVTR (g/100 in²/day) | MVTR (g/100 in²/day) aged at 50° C./12 hrs | O2TR (cc/100 in²/day) | Gloss (60°) cast side | Gloss (20°) sealant side | Haze |
|---|---|---|---|---|---|---|---|---|---|---|---|---|
| Ex3 | 10 | | | | | B5K | 0.232 | 0.190 | 1.67 | 128 | 88 | 3.7 |
| Ex4 | 10 | | | | | B18 | 0.226 | 0.217 | 0.035 | 131 | 93 | 3.2 |
| Ex5 | 10 | 1.0 | | | 600 | B5K | 0.145 | 0.121 | 1.55 | 123 | 80 | 3.8 |
| Ex6 | 10 | 1.0 | | | 600 | B18 | 0.182 | 0.136 | 0.027 | 125 | 82 | 3.8 |
| Ex7 | 10 | | 1.0 | | 600 | B5K | 0.167 | 0.159 | 1.73 | 126 | 87 | 3.7 |
| Ex8 | 10 | | 1.0 | | 600 | B18 | 0.177 | 0.158 | | 129 | 88 | 3.6 |
| Ex9 | 10 | | | 1.0 | 600 | B5K | 0.206 | | 0.982 | 126 | 83 | 3.6 |
| Ex10 | 10 | | | 1.0 | 600 | B18 | 0.191 | 0.176 | 0.047 | 122 | 74 | 3.2 |
| CEx1 | 10 | | 1.0 | | 600 | | 0.204 | 0.161 | | 118 | 80 | 4.6 |
| CEx2 | 10 | | 1.0 | | | | 0.231 | 0.154 | | 117 | 81 | 4.3 |
| CEx3 | 10 | | 1.0 | | | B5K | 0.197 | 0.153 | 1.35 | 126 | 86 | 3.7 |

TABLE 2

| Example | HCR (%) | Polywax 400 (%) | Polywax 500 (%) | FP (ppm) | Coating | MVTR (g/100 in2/day) | MVTR (g/100 in2/day) aged at 50° C./12 hrs | Gloss (60°) cast side | Gloss (20°) sealant side | Haze |
|---|---|---|---|---|---|---|---|---|---|---|
| Ex11 | 10.0 | | | | | 0.175 | 0.172 | 104 | 68 | 4.7 |
| Ex12 | 10.0 | 1.0 | | | | 0.159 | 0.131 | 101 | 59 | 4.7 |
| Ex13 | 10.0 | 1.0 | | 600 | | 0.168 | 0.129 | 103 | 61 | 4.8 |
| Ex14 | 10.0 | 1.0 | | 600 | B18 | | 0.136 | 114 | 69 | 4.1 |
| Ex15 | 10.0 | | 1.0 | 600 | | 0.167 | 0.143 | 103 | 51 | 5 |
| Ex16 | 10.0 | | 1.0 | 600 | B18 | | 0.154 | 110 | 60 | 4.5 |
| CEx4 | 10.0 | | | 3000 | | 0.195 | 0.146 | 109 | 66 | 4.6 |
| CEx5 | 10.0 | | | 3000 | B18 | | 0.164 | 114 | 72 | 4 |

TABLE 3

| Example | HCR (%) | Polywax 400 (%) | Polywax 500 (%) | Coating | MVTR (g/100 in2/day) | MVTR (g/100 in2/day) aged at 50° C./12 hrs | O2TR (cc/100 in2/day) | Gloss (60°) cast side | Gloss (20°) sealant side | Haze |
|---|---|---|---|---|---|---|---|---|---|---|
| Ex17 | 10 | | | | 0.175 | | 73.5 | 108 | 64 | 4.1 |
| Ex18 | 10 | | | B18 | 0.172 | 0.165 | 0.368 | 105 | 58 | 4.1 |
| Ex19 | 10 | 1.0 | | | 0.139 | 0.104 | | 103 | 54 | 4.2 |
| Ex20 | 10 | 1.0 | | B18 | 0.158 | 0.109 | 0.362 | 116 | 73 | 3.2 |
| Ex21 | 10 | 1.5 | | | 0.118 | 0.101 | 59.9 | 103 | 55 | 4.2 |
| Ex22 | 10 | 1.5 | | B18 | 0.133 | 0.103 | 1.18 | 114 | 67 | 3.3 |
| Ex23 | 10 | 2.0 | | | 0.127 | 0.078 | | 102 | 52 | 4.4 |
| Ex24 | 10 | 2.0 | | B18 | 0.098 | 0.074 | 1.18 | 112 | 63 | 3.7 |
| Ex25 | 10 | | 1.5 | | 0.157 | 0.117 | | 98 | 48 | 4.9 |
| Ex26 | 10 | | 1.5 | B18 | 0.172 | 0.102 | 1.02 | 112 | 66 | 3.4 |
| CEx6 | | 2.0 | | | 0.234 | 0.179 | | 93 | 53 | 4.9 |
| CEx7 | | 2.0 | | B18 | 0.304 | 0.150 | 2.57 | 133 | 110 | 2.4 |
| CEx8 | | | 2.0 | | 0.198 | 0.279 | | 90 | 46 | 5.1 |
| CEx9 | | | 2.0 | B18 | 0.261 | 0.199 | 2.20 | 131 | 103 | 2.6 |

TABLE 4

| Example | HCR (%) | HCR1 (%) | Polywax 400 (%) | Polywax 500 (%) | Polywax 600 (%) | WAX# 178P (%) | WAX# 201P (%) | Coating | MVTR (g/100 in2/day) | MVTR (g/100 in2/day) aged at 50° C./12 hrs | O2TR (cc/100 in2/day) | Gloss (60°) cast side | Gloss (20°) sealant side | Haze |
|---|---|---|---|---|---|---|---|---|---|---|---|---|---|---|
| Ex27 | 12.5 | | | | | | | B18 | 0.184 | 0.164 | 0.088 | 103 | 47 | 4.4 |
| Ex28 | 12.5 | | 0.5 | | | | | B18 | 0.176 | 0.136 | 0.055 | 116 | 69 | 3 |
| Ex29 | 12.5 | | 1.0 | | | | | B18 | 0.159 | 0.124 | 0.041 | 112 | 61 | 4 |

TABLE 4-continued

| Example | HCR (%) | HCR1 (%) | Polywax 400 (%) | Polywax 500 (%) | Polywax 600 (%) | WAX# 178P (%) | WAX# 201P (%) | Coating | MVTR (g/100 in2/day) | MVTR (g/100 in2/day) aged at 50° C./12 hrs | O2TR (cc/100 in2/day) | Gloss (60°) cast side | Gloss (20°) sealant side | Haze |
|---|---|---|---|---|---|---|---|---|---|---|---|---|---|---|
| Ex30 |  | 10.0 |  | 1.0 |  |  |  | B18 | 0.230 | 0.151 | 0.078 | 102 | 44 | 4.2 |
| Ex31 |  | 10.0 |  | 1.5 |  |  |  | B18 | 0.212 | 0.128 | 0.153 | 103 | 45 | 4.2 |
| Ex32 | 10.0 |  |  | 1.0 |  |  |  | B18 | 0.190 | 0.139 | 0.022 | 104 | 50 | 3.9 |
| Ex33 | 10.0 |  |  |  | 1.5 |  |  | B18 | 0.189 | 0.140 | 0.026 | 99 | 45 | 4 |
| Ex34 | 10.0 |  |  |  |  | 1.5 |  | B18 | 0.186 | 0.123 | 0.040 | 102 | 48 | 3.9 |
| Ex35 | 10.0 |  |  |  |  |  | 1.5 | B18 | 0.252 | 0.141 | 0.041 | 103 | 50 | 4 |

Test Methods

The various properties in the above examples were measured by the following methods:

Moisture vapor transmission rate (MVTR) of the films was measured by using a Mocon® Permatran 3/31 unit measured substantially in accordance with AS™ F1249. In general, the preferred value can be an average value equal to or less than about 0.17 g/100 in$^2$/day (2.64 g/m$^2$/day).

Oxygen gas transmission rate (O2TR) of the films was measured with a Mocon® Oxtran®2/20 Oxygen Permeability Testing Apparatus (manufactured by Mocon Inc.) substantially in accordance with AS™ D3985. In general, the preferred value can be an average value equal to or less than about 2.0 cc/100 in$^2$/day (31.0 cc/m$^2$/day); and more preferably, less than about 1.0 cc/100 in$^2$/day (15.5 cc/m$^2$/day).

Films for MVTR analysis were tested directly without lamination to other substrates. Films for O2TR analysis were laminated to a substrate of PATCO 502A low density polyethylene/acrylic adhesive pressure sensitive tape (Berry Plastics, Bristol, R.I.) adhered to the outer surface of the layer (A) for uncoated film or to the outer surface of the coating layer (D).

Forced heat-aging of the test films was conducted as follows: several 8½"×11" cut-sheet samples of the exemplary films (e.g. about a dozen sheets of one of the respective film variables) were stacked or cut from a slab sample with the corona discharge-treated surface of the cut-sheet film samples facing in the "up" position. This stack of film samples were then placed between two smooth, flat steel plates (ordinary office printer paper was placed over the top film sheet sample and on top of the bottom steel plate to separate the film samples from direct contact with the steel plates), and this construction was then placed inside a conditioning oven. A 30-lbs weight was placed on top of the uppermost steel plate. The conditioning oven was set for about 40-70° C. for about 12-48 hours as desired. If aging at a lower temperature, the aging time should be extended, e.g. if 40° C. aging temperature is used, the aging time should be extended to about 24-48 hours. Preferably, the aging time can be about 12 hours and aging temperature used can be about 50° C. for the Examples of this invention. After aging, the stack of film samples was removed and allowed to cool to room temperature. The weight and upper steel plate were removed, and the office paper and the first sheet of the film sample stack were discarded. The remaining film sheet samples were carefully separated for moisture vapor transmission rate test.

Haze of the film was measured using a BYK Gardner Instruments "Haze-Gard Plus" haze meter substantially in accordance with AS™ D1003. Preferred haze values can be about 5% or less for a single sheet.

Gloss of the film was measured using a commercially available gloss meter such as available from BYK Gardner Instruments "Mirror-Tri-Gloss" and measured substantially in accordance with AS™ D2457. Gloss was measured on both sides of the film, at an angle of 60° for the cast side (coated or not coated side) and an angle of 20° for the opposite side (heat sealable or functional side). Preferred values for cast side 60° gloss were about 95 or higher (preferably ca. 100 or higher); preferred values for the heat sealable side 20° gloss can be about 40 or higher (preferably ca. 50 or higher).

This application discloses several numerical ranges in the text and figures. The numerical ranges disclosed inherently support any range or value within the disclosed numerical ranges even though a precise range limitation is not stated verbatim in the specification because this invention can be practiced throughout the disclosed numerical ranges.

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein. Finally, the entire disclosure of the patents and publications referred in this application are hereby incorporated herein by reference.

What is claimed is:

1. A method of making a film comprising:
   coextruding a core layer comprising high crystalline polypropylene, hydrocarbon resin, and 0.5 wt. % polyethylene wax with a skin layer comprising polyolefin; and
   adding a barrier layer comprising crosslinked polar polymers on a surface of the core layer opposite the skin layer.

2. The method of claim 1, wherein the barrier layer is coextruded on the surface of the core layer opposite the skin layer.

3. The method of claim 1, wherein the barrier layer is coated on the surface of the core layer opposite the skin layer.

4. The method of claim 3, wherein the film is oriented in the machine direction prior to coating of the barrier layer.

5. The method of claim 4, wherein the film is oriented in the transverse direction after coating the film with the barrier layer.

6. The method of claim 1, further comprising coextruding a tie-layer comprising polyolefin on a surface of the core layer opposite the skin layer.

7. The method of claim 6, wherein the barrier layer is inline or offline coated on the surface of the tie-layer opposite the core layer.

8. The method of claim 6, wherein the barrier layer is coextruded on the surface of the tie-layer opposite the core layer.

9. The method of claim 1, further comprising heat aging the film.

10. The method of claim 9, wherein the aging temperature is lower than a Tg of the hydrocarbon resin and a melting temperature of the polyethylene wax.

11. The method of claim 9, wherein the aging temperature is from 40-70° C. and the aging time is from 12 to 48 hours.

* * * * *